March 17, 1931.                T. M. HUNTER                1,796,892
                          SPOT WELDING APPARATUS
                          Filed June 21, 1929         2 Sheets-Sheet 1
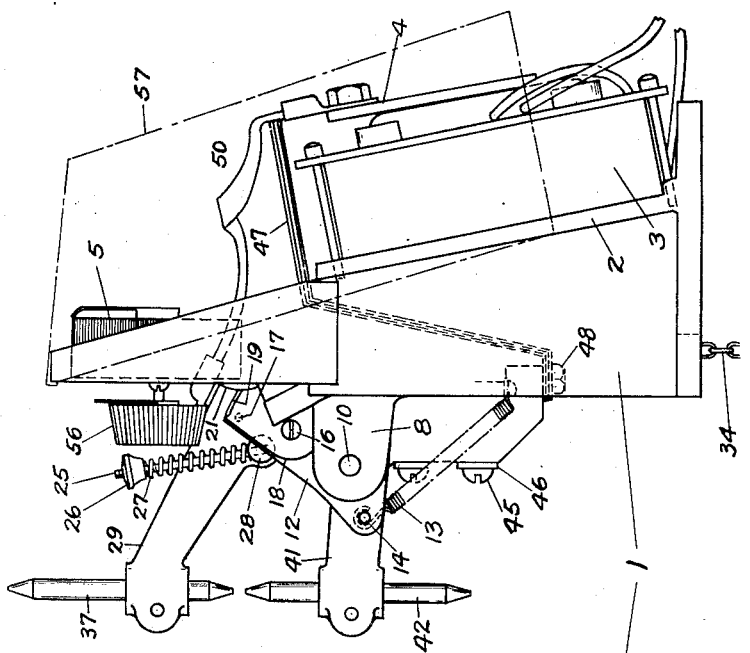
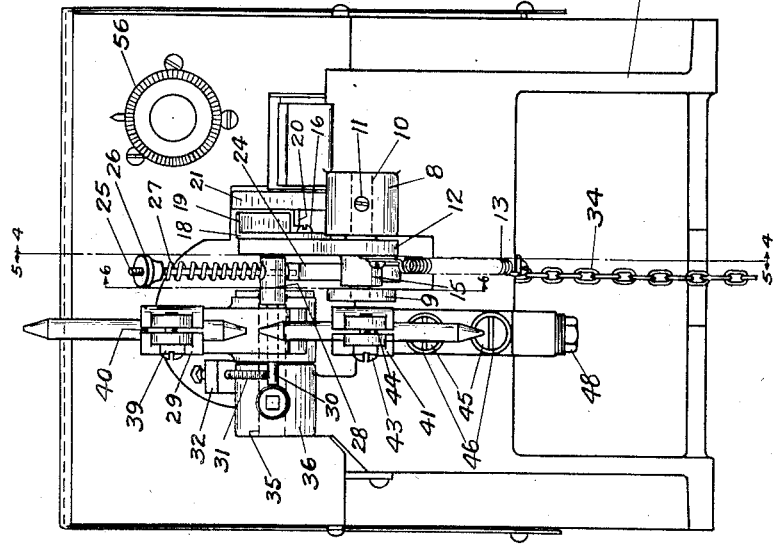
Inventor
THOMAS M. HUNTER
By His Attorney
A. D. F. Libby

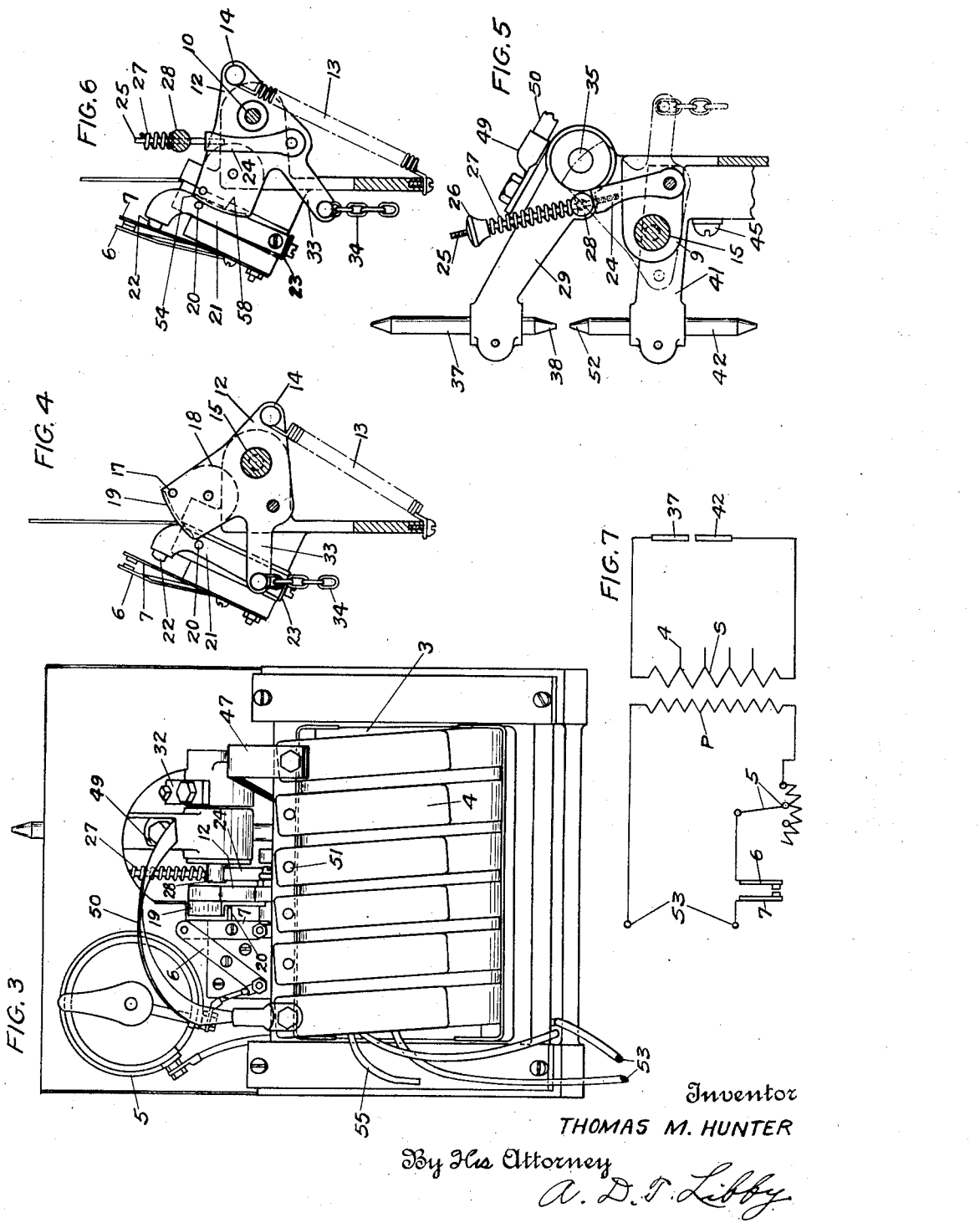

Patented Mar. 17, 1931

1,796,892

UNITED STATES PATENT OFFICE

THOMAS M. HUNTER, OF EAST ORANGE, NEW JERSEY, ASSIGNOR TO AMERICAN TRANSFORMER COMPANY, OF NEWARK, NEW JERSEY

SPOT-WELDING APPARATUS

Application filed June 21, 1929. Serial No. 372,633.

This invention relates to a unitary piece of apparatus which is particularly adapted for use in the spot welding of small parts, especially those used in the construction of vacuum tubes used in radio receiving sets; but of course, the apparatus may be used for other purposes.

One of the objects of my invention is to provide a spot welding apparatus in which all of the parts are brought together into a single, compact, unitary piece of apparatus which is readily portable for the convenience of the operator.

Another object of my invention is to provide a spot welding apparatus which by reason of its compactness is highly efficient, due to the low electrical losses brought about by this particular design.

Another object of my invention is to provide an apparatus such as described, wherein the parts are so arranged as to protect the operator from "flashes" which occur when one or more parts of the circuits included within the apparatus are opened at the beginning or end of the welding operation.

Another object of my invention is to provide a spot welding apparatus having generally a strong and rigid construction, and one in which the moving parts are positive in their operation.

These and other objects will be clear to one skilled in this art, after reading the specification taken in connection with the annexed drawings, wherein:

Figure 1 is a front view of the spot welding apparatus.

Figure 2 is a side elevation looking from the right of Figure 1, but with the cover shown in dotted position.

Figure 3 is a view of the rear part of the apparatus with the cover removed.

Figure 4 is a part-sectional view on the line 4—4 of Figure 1.

Figure 5 is a view on the same line, but looking in the direction of the arrows 5—5.

Figure 6 is a part-sectional view on the line 6—6 of Figure 1, with certain of the parts in different position of operation.

Figure 7 is a diagrammatic view of the circuit of the apparatus.

Referring now to the drawings, wherein like numbers refer to corresponding parts in the various views, 1 generally refers to a framework carrying the various parts of the apparatus. On a flange 2 of the frame 1, is mounted an alternating current transformer 3 having a primary P, and a relatively heavy current secondary S with taps 4 of bar conductors welded or soldered to the convolutions of the secondary S. The method of constructing the transformer, is along the lines disclosed in my Patent 1,547,497, issued July 28, 1925.

Mounted on the back of the framework, is a rheostat 5 which is connected as shown in Figure 7, to the primary circuit of the transformer, which primary is adapted to be connected to any suitable source of current having 110 or 220 volts, etc. Mounted closely adjacent the rheostat 5 on the back of the framework, are two contact members 6 and 7 which are connected to the primary circuit of the transformer and as indicated, these switch contacts 6 and 7 are normally open.

Projecting forwardly from the frame, are two lugs 8 and 9 between which is supported a shaft or spindle 10. The spindle 10 is held in position in any satisfactory manner as by set screw 11. Pivotally mounted on the spindle 10, is an irregularly shaped lever 12 which is normally held in the position shown in Figures 1 and 2 by a spring 13 having one end attached to the frame 1, and the other end to a pin 14, fastened to the lever 12.

In order to give a substantial bearing, the lever 12 is provided with an integral hub 15. Attached to the lever 12 on the side opposite the hub 15, in any satisfactory manner as by screw 16 and dowel pin 17, is a member 18 having a lip 19 which acts as a cam. Preferably the hole in the member 18 for the screw 16, is made somewhat larger than the diameter of the screw, whereby the cam member 18 may be oscillated slightly about the dowel 17 in order to get a correct adjustment of the cam 19, which is adapted to engage a pin 20 carried on a lever 21. The lever 21 is preferably provided with an insulated bushing 22 which is adapted to engage the contact member 7 to force it into engagement with the contact member 6, as will be more fully described later. The lever 21 is held in the position shown in Figure 4, by a spring 23.

To the lever 12, is fastened a stud 24 having an extension in the shape of a pin 25 which is preferably threaded on the outer end to receive an adjusting nut 26. Positioned over the pin 25, is a spring 27, one end of which rests against a stud 28 through which the pin 25 passes. The stud 28 projects through a welding contact arm 29, and the projecting end 30 acts as a stop for an adjusting screw 31 carried by a bracket 32 which is mounted on the frame 1. The lever 12 has a projecting part or arm 33, to which is attached a suitable operating member, such as a chain 34, which is preferably brought out and arranged so that tension may be applied to the chain by means of the operator's foot, whereby the lever 12 is operated.

The welding arm 29 is pivotally supported on a stub shaft 35 carried on the support member 36, forming part of frame 1. The electrode arm 29 is preferably made of cast copper of considerable cross-sectional area, so as to carry a relatively heavy current out to the electrode 37, which is preferably of copper and pointed at 38 to the desired shape. The electrode 37 is preferably adjustable in the arm 29 by means of a set screw 39, it being understood that the end of the arm 29 is split at 40 to provide for this adjustment.

Cooperating with the movable arm electrode 29, is a stationary electrode arm 41 carrying an electrode 42, having its end shaped at 52 to cooperate with the end 38. The electrode 42 is preferably adjustable by means of a set screw 43, the arm 41 being slotted at 44 to provide for this adjustment. The arms 29 and 41 are insulated one from the other, and in order to do this, it is preferable to insulate the arm 41, which is mounted on frame 1, through the medium of screws 45 and insulators 46. One end of the secondary S of the transformer is connected by means of a relatively heavy conductor 47, preferably made of a plurality of thin copper strips, to the electrode arm 41 by means of a cap screw 48.

Attached to the arm 29, through the medium of a terminal 49, is a flexible conductor 50, which is connected to the opposite working terminal of the secondary S of the transformer. As will be seen by reference to Figure 3, the conductors 47 and 50 may be shifted to any one of the taps 4, holes 51 being provided in these taps for making these connections which are very short and of high conducting material, such as copper, whereby the voltage drop in them is substantially nil, it being understood that the transformer secondary S is of a relatively low voltage, on the order of one to four volts, and the current for this spot welding apparatus is in the neighborhood of one to two hundred amperes.

Coming now to the operation of my apparatus, keeping in mind that the source of current is connected to the apparatus with the leads 53, the work to be spot welded is placed between the contact points 38 and 52, and the operator then applies force or power to the chain 34. This starts the lever 12 into operation, and during the first part of the movement of the lever 12, the welding contact points 38 and 52 are brought into engagement with the work through the medium of the stud 24 acting on the stud 28, which is fastened to the movable welding arm 29.

Immediately after these contacts 38 and 52 are closed on the work, the cam 19 engages the pin 20 (see Fig. 4) causing the pin to ride over the outer surface of the cam 19, thereby pushing the lever 21 against the switch contact 7, moving it into engagement with the switch contact 6, thereby closing the primary circuit of the transformer and causing current to flow in the secondary through the spot welding contacts 38 and 52. Continued movement of the lever 12 to the position shown in Figure 6, is permitted by reason of the spring 27, which allows the pin 25, forming a continuation of the stud 24, to be drawn downward against the spring 27. The spring 27 also regulates the amount of pressure applied to the welding contacts. As the lever 12 is moved to the end of its stroke, the pin 20 slips off the end 54 of the cam 19, allowing the lever 21 to be returned by the spring 23 to its normal position, as shown in Figure 4, thereby opening the primary circuit of the transformer and stopping the welding operation.

The operator then releases the strain on the chain 34, and the spring 13 returns the lever 12 back to its normal position as shown in Figure 4, thereby also moving the arm 29 to open position when the apparatus is ready for a succeeding operation. On the return movement of the lever 12, it is to be understood that the pin 20 will pass underneath the side 58 of the cam.

While the primary may be provided with taps, one of which is shown at 55, I prefer to use the rheostat 5 in the primary of the transformer, in order to get a very close regulation of the current delivered from the secondary. However, in some cases, the rheostat 5 may not be necessary, but when it is used, I mount it on the back of a part of the framework and operate it by any suitable means, as by a knob 56.

It will be observed that the switch members 6 and 7 are concealed from the operator so that the operator will get no "flash" when the switch contacts are open, as described, and by breaking the primary circuit previous to the opening of the contacts at the welding electrodes, no arc or "flash" is produced before the eyes of the operator. A cover 57 as shown in dotted line in Figure 2, is provided so as to conceal the transformer, the rheostat, and the switch members, and protect them from dust and dirt and injury.

It will be clearly apparent that while I have illustrated in the drawings, on reduced scale, a preferred form of my invention, various changes may be made in the details, without departing from the spirit of my invention or the scope of the appended claims.

Having thus described my invention, what I claim is:

1. In a spot welding apparatus, a frame, a stationary welding contact arm fastened to the frame, a contact carried by said arm, a movable welding arm carried by the frame and carrying a contact to cooperate with the first contact, one of said arms being insulated from the other and each being provided with means for attaching a connection from the secondary of a welding transformer, a pair of switch contacts mounted on the frame for closing and opening the primary circuit of said transformer, a rheostat for controlling the current in the primary of said transformer and carried by the frame, a lever pivotally mounted on the frame, a cam carried by the lever, a second lever positioned to actuate said switch contacts, a pin carried by the second lever to be engaged by said cam for the purpose described, an arm on the first lever having a yielding connection with the movable welding arm, means for actuating said first lever, and means for returning it to normal position after having been actuated.

2. In a spot welding apparatus, a frame, a stationary welding contact arm fastened to the frame, a contact carried by said arm, a movable welding arm carried by the frame and carrying a contact to cooperate with the first contact, one of said arms being insulated from the other and each being provided with means for attaching a connection from the secondary of a welding transformer, a pair of switch contacts mounted on the frame for closing and opening the primary circuit of said transformer, a rheostat for controlling the current in the primary of said transformer and carried by the frame, a pair of levers mounted on the frame, one lever being provided with means for operation by an operator, and the second operated by the first, operating means between the two levers disposed so the first lever has a predetermined movement before movement of the second lever is started, an arm on the first lever having a yielding connection with the movable welding arm allowing the first lever to continue movement after closing said welding contacts on the work, said second lever being actuated to close said switch contacts after the welding contacts have been closed on the work, the operating means between the two levers being such as to permit the return of the second lever just before the first lever reaches its full stroke, whereby the primary circuit is opened at said switch contacts before the welding circuit is opened toward the end of the return stroke of said lever.

3. In a spot welding apparatus, a frame, a stationary welding contact arm fastened to the frame, a contact carried by said arm, a movable welding arm adjustably carried by the frame and carrying a contact to cooperate with the first contact, one of said arms being insulated from the other and each being provided with means for attaching a connection from the secondary of a welding transformer, a pair of switch contacts for closing and opening the primary circuit of a welding transformer, said switch contacts being mounted in concealed position from the operator of the apparatus, means for regulating the current in the primary of the transformer, said means having an operating member on the exterior of the frame, a pair of levers mounted on the frame, one lever being provided with means for operation by an operator, and the second operated by the first, operating means between the two levers disposed so the first lever has a predetermined movement before movement of the second lever is started, an arm on the first lever having a yielding connection with the movable welding arm allowing the first lever to continue movement after closing said welding contacts on the work, said second lever being actuated to close said switch contacts after the welding contacts have been closed on the work, the operating means between the two levers being such as to permit the return of the second lever just before the first lever reaches its full stroke, whereby the primary circuit is opened at said switch contacts before the welding circuit is opened toward the end of the return stroke of said lever.

4. A spot welding apparatus including a frame, a transformer fastened to the frame, said transformer having a primary and a low voltage heavy current secondary, a stationary welding contact arm fastened to the frame, a contact carried by said arm, a movable welding arm carried by the frame and carrying a contact to cooperate with the first contact, one of said arms being insulated from the other and each being provided with means for attaching a connection from the secondary of said transformer, a pair of switch contacts mounted within the confines of the frame, said switch contacts being in the primary circuit of the transformer, means for regulating the circuit in the primary of the transformer, an operator-controlled lever pivotally mounted on the frame and carrying a cam, a second lever positioned to actuate said switch contacts, said second lever having a part engaged by said cam on the working stroke of the first lever and after a predetermined early movement of the first lever has taken place, an arm on the first lever having a yielding connection with the movable welding arm, means for moving the first lever to first close the welding contacts on the work on said early movement of the first lever, and then through said cam to move the second lever to close the primary of the transformer, said cam passing out of engagement with said second lever part, allowing the same to return to normal position to open the primary circuit of the transformer before the first lever is returned to open the welding circuit, and means to insure that the first lever is returned to normal position on release by the operator.

5. A spot welding apparatus including a frame, a transformer fastened to the frame, switch contacts mounted on the frame and connected in the primary circuit, a rheostat mounted on the frame but having an operating member extending through the frame, a cover for concealing the transformer, switch contacts and rheostat, a pair of welding contacts, welding arms for carrying said welding contacts mounted on the front of said frame, at least one of said arms being movable with respect to the other, and one insulated from the other, said arms being connected to opposite parts of the secondary of the transformer by short heavy leads, an operator-actuated lever having a yielding connection to said movable welding arm, a second lever positioned to actuate said switch contacts, cooperating means carried by both of said levers to actuate the second lever to close said switch contacts after the first lever has been moved to close the welding contacts on the work, said means also co-acting to allow the second lever to return to normal position, thereby opening the primary circuit of the transformer before the first lever has reached the limit of its working stroke, and therefore before the welding circuit is opened, and means to insure that the first lever is returned to normal position to thereby open the welding circuit.

6. In a spot welding apparatus, a frame, a stationary welding contact arm fastened to the frame, a contact carried by said arm, a movable welding arm carried by the frame and carrying a contact to cooperate with the first contact, one of said arms being insulated from the other and each being provided with means for attaching a connection from the secondary of a welding transformer, a pair of switch contacts in the primary circuit of the transformer, a cover for concealing the transformer and switch contacts, a pair of welding arms carrying contacts, at least one of which contacts is adjustable in the arms, said arms being mounted on the frame, and one of them being adjustable and movable with respect to the other, and one being insulated from the other, said arms being connected by short heavy conductors to opposite parts of the secondary of said transformer, an operator-actuated lever having a yielding connection to said movable welding arm, a second lever positioned to actuate said switch contacts, cooperating means carried by both of said levers to actuate the second lever to close said switch contacts after the first lever has been moved to close the welding contacts on the work, said means also co-acting to allow the second lever to return to normal position, thereby opening the primary circuit of the transformer before the first lever has reached the limit of its working stroke, and therefore before the welding circuit is opened, and means to insure that the first lever is returned to normal position to thereby open the welding circuit.

7. A spot welding apparatus including a frame, a pair of welding arms carrying contacts, said arms being mounted on the frame, and at least one of them being adjustable and movable with respect to the other, and one being insulated from the other, said arms having connections leading to the secondary of a transformer, switch contacts for opening and closing the primary circuit of the transformer, an operator-actuated lever having a yielding connection to said movable welding arm, a second lever positioned to actuate said switch contacts, cooperating means carried by both of said levers to actuate the second lever to close said switch contacts after the first lever has been moved to close the welding contacts on the work, said means also co-acting to allow the second lever to return to normal position, thereby opening the primary circuit of the transformer before the first lever has reached the limit of its working stroke, and therefore before the welding circuit is opened, and means to insure that the first lever is returned to normal position to thereby open the welding circuit.

8. A spot welding apparatus including a frame, a pair of welding arms carrying contacts, said arms being mounted on the frame, and at least one of them being adjustable and movable with respect to the other, and one being insulated from the other, said arms having connections leading to the secondary of a transformer, switch contacts for opening and closing the primary circuit of the transformer, a rheostat also in the primary circuit of the transformer, a cover for concealing said switch contacts and rheostat, said welding contact arms extending from the front of the frame, whereby work may be quickly passed between said contacts, an operator-actuated lever having a yielding connection to said movable welding arm, a second lever positioned to actuate said switch contacts, cooperating means carried by both of said levers to actuate the second lever to close said switch contacts after the first lever has been moved to close the welding contacts on the work, said means also co-acting to allow the second lever to return to normal position, thereby opening the primary circuit of the transformer before the first lever has reached the limit of its working stroke, and therefore before the welding circuit is opened, and means to insure that the first lever is returned to normal position to thereby open the welding circuit.

9. A unitary piece of welding apparatus including, a frame, a transformer fastened to the frame, switch contacts and a rheostat in the primary circuit of the transformer, a cover for concealing the transformer, switch contacts, and rheostat, welding electrodes mounted on the front of the frame and connected by short heavy conductors to the secondary of the transformer, at least one of said electrodes being movable, and one being insulated with respect to the other, an operating lever for the movable electrode and having a yielding connection therewith to allow the lever to be moved after closing the electrodes on the work, a second lever positioned to actuate said switch contacts, cooperating means carried by both of said levers to actuate the second lever to close said switch contacts after the first lever has been moved to close the welding contacts on the work, said means also co-acting to allow the second lever to return to normal position, thereby opening the primary circuit of the transformer before the first lever has reached the limit of its working stroke, and therefore before the welding circuit is opened, and means to insure that the first lever is returned to normal position to thereby open the welding circuit.

10. A unitary piece of welding apparatus including; a frame, a transformer, primary switch contacts and secondary welding electrodes all carried on the frame, a lever for first closing said electrodes on to the work and then closing the primary circuit, said lever carrying devices which will allow the primary circuit to open before the secondary circuit is opened at the electrodes on release of said means.

11. A unitary piece of welding apparatus including; a frame, a transformer, switch contacts in the primary circuit of the transformer, and secondary welding electrodes, all carried on the frame, a cover for concealing all but the electrodes, a pair of levers co-acting to first close said electrodes on to the work, and then close the primary circuit through said switch contacts, said levers acting on their return movements to first open the primary circuit at said switch contacts, and then open the secondary circuit at the electrodes, means for operating one of the levers, and means for returning both levers to normal position.

12. A unitary piece of welding apparatus including; a frame, a transformer, switch contacts and a rheostat in the primary circuit of the transformer, welding electrodes connected to the secondary of the transformer, one of said electrodes being movable, and one insulated from the other, a pair of levers, one actuated by movement of the other, means for moving the last mentioned lever to first move said movable electrode to engage the work with the other electrode, and then to move the first mentioned lever to close said switch contacts, said levers acting on their return movement, the one to open the switch contact in the primary circuit, and the other to open the said electrodes, and means for insuring that both levers are returned to normal position on release of the second mentioned lever.

13. A unitary piece of welding apparatus including; a frame, a transformer, switch contacts and a rheostat in the primary circuit of the transformer, and a pair of welding electrode arms carrying electrodes all supported by the frame, one of said arms being movable and one insulated from the other, a lever having a spring take-up connection with said movable electrode arm, a second lever for operating said switch contacts, means co-acting between said levers to move the second lever from the first, said spring take-up connection allowing the first lever to continue its movement after closure of the welding electrodes on the work, and to move the second lever, the tension of said spring being adjustable to regulate the pressure applied to the work by said electrodes, said co-acting means permitting the second lever to return to normal position before the first lever, as and for the purposes described.

In testimony whereof, I affix my signature.

THOMAS M. HUNTER.